US012800345B2

(12) United States Patent
Abdelgawad et al.

(10) Patent No.: US 12,800,345 B2
(45) Date of Patent: Nov. 17, 2026

(54) CHECKING A DIGITAL ROAD MAP FOR LOCAL PLAUSIBILITY

(71) Applicant: Robert Bosch GmbH, Stuttgart (DE)

(72) Inventors: Shehabeldin Abdelgawad, Stuttgart (DE); Vladislav Tananaev, Sindelfingen (DE); Danny Hiendriana, Ludwigsburg (DE); Manuel Stuebler, Stuttgart (DE); Borislav Antic, Heidelberg (DE); Benjamin Hoeferlin, Pleidelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 18/693,205

(22) PCT Filed: Sep. 13, 2022

(86) PCT No.: PCT/EP2022/075330

§ 371 (c)(1),
(2) Date: Mar. 19, 2024

(87) PCT Pub. No.: WO2023/046521

PCT Pub. Date: Mar. 30, 2023

(65) Prior Publication Data

US 2025/0123120 A1 Apr. 17, 2025

(30) Foreign Application Priority Data

Sep. 23, 2021 (DE) ..................... 10 2021 210 568.8

(51) Int. Cl.
*G01C 21/00* (2006.01)
*B60W 60/00* (2020.01)

(52) U.S. Cl.
CPC ....... *G01C 21/3859* (2020.08); *B60W 60/001* (2020.02); *B60W 2554/4046* (2020.02); *B60W 2556/40* (2020.02)

(58) Field of Classification Search
CPC ......................... G08G 1/09626; B60W 60/001
USPC ........................................................... 701/25
See application file for complete search history.

(56) References Cited

U.S. PATENT DOCUMENTS 11,858,529 B1 * 1/2024 Costantino ............ B60W 40/02
2019/0031193 A1 1/2019 Kojima
2020/0098135 A1 * 3/2020 Ganjineh .................. G06T 7/75
2023/0042431 A1 * 2/2023 Ramamoorthy ........ G06F 17/18

FOREIGN PATENT DOCUMENTS

DE 102017211613 A1 1/2019
JP 2010-96557 A 4/2010
JP 2017-90548 A 5/2017
JP 2018-45500 A 3/2018
JP 2020-38634 A 3/2020
JP 2021-117048 A 8/2021
WO 2017/169021 A1 10/2017
WO 2019038185 A1 2/2019

OTHER PUBLICATIONS

International Search Report corresponding to PCT Application No. PCT/EP2022/075330, mailed Feb. 20, 2023. (German and English language document). (5 pages).

* cited by examiner

*Primary Examiner* — Tara Schimpf
(74) *Attorney, Agent, or Firm* — Maginot, Moore & Beck LLP

(57) ABSTRACT

A method is for checking whether a digital road map correctly reproduces actual circumstances visible from at least one predefined pose. The method includes procuring observations of a scenario from the at least one predefined pose, determining an actual behavior of one or more other road users from the procured observations, and determining a reference behavior of the one or more other road users based on one or more features of the digital road map. The method further includes, in response to the determined actual behavior being consistent with the determined reference behavior, establishing that the digital road map correctly reproduces the actual circumstances visible from the at least one predefined pose at least with regard to the one or more features from which the reference behavior was determined.

14 Claims, 2 Drawing Sheets

CHECKING A DIGITAL ROAD MAP FOR LOCAL PLAUSIBILITY

This application is a 35 U.S.C. § 371 National Stage Application of PCT/EP2022/075330, filed on Sep. 13, 2022, which claims the benefit of priority to Serial No. DE 10 2021 210 568.8, filed Sep. 23, 2021 in Germany, the disclosures of which are incorporated herein by reference in their entirety.

The disclosure relates to the checking of digital road maps that are used, for example, by vehicles that are at least partially automated or by driving assistance systems.

BACKGROUND

Driving assistance systems and systems for at least partially automated driving use digital road maps to plan the vehicle's actions. Starting from a pose of the vehicle, which is determined on the basis of sensor data and/or information from a localization system, for example a fully or partially satellite-based one, information is retrieved from the road map and included in the planning.

To ensure that the vehicle's actions are appropriate to the current traffic situation, the digital road maps must be kept up to date at all times. However, even if all updates provided by the respective manufacturer are installed promptly, a traffic situation can still be changed at short notice so that it is no longer reproduced correctly by the digital road map. For example, a roadworks site can be set up overnight, making one lane unusable.

WO 2019/038 185 A1 discloses the use of a mobile device to record corrections for a digital map previously received from an external server and to send a highly accurate map enriched by these corrections back to the external server.

SUMMARY

As part of the disclosure, a method was developed for checking whether a digital road map correctly reproduces the actual circumstances visible from at least one predefined pose. In this context, the pose comprises a position and an orientation relative to the coordinate system of the digital road map. For example, the pose of a vehicle comprises both its position and the direction in which it is oriented. Both the position and the orientation determine what exactly can be seen from the vehicle. The pose can, for example, be determined by any localization device and represents an input of the method described here. The localization device can, for example, match features visible from the vehicle with features on the digital road map.

As part of this method, observations of a scenario are procured from at least one pose. In particular, this can be the pose of a vehicle to be steered in the scenario, and the observations can be made from this vehicle. In common parlance, the vehicle to be steered is also referred to as an ego vehicle.

The actual behavior of one or more other road users is determined from the observations. This can include, for example, identifying and tracking moving objects based on the observations. From the trajectories of other road users determined in this way, various aspects of the actual behavior of these road users can be determined. In particular, these aspects may comprise aspects that cannot be deduced directly from the scenario, such as traffic signs, road markings or other directly evaluable information.

Based on one or more features of the digital road map, a reference behavior of the other road user(s) is determined.

Examples of features of the digital road map that have an influence on the reference behavior of road users are

- the topology of roadways and/or lanes, including intended connections between these roadways or lanes;
- boundaries between lanes, including the extent to which lane changes are permitted;
- a preferred route for journeys to a specific destination;
- a prescribed direction of travel and
- right of way rules.

It is now checked whether the actual behavior is consistent with the reference behavior. If this is the case to at least a predefined extent, or in accordance with a predefined criterion, it is established that the digital road map correctly reproduces the actual circumstances visible from the predefined pose, at least with regard to the features from which the reference behavior was determined. If, on the other hand, the actual behavior is not consistent with the reference behavior, one or more features of the digital road map associated with the reference behavior can be falsified, i.e., recognized as not corresponding to the actual circumstances.

For this check to be successful, the actual behavior of other road users must be correctly determined. This in turn requires that the observations of the scenario are recorded in sufficiently good quality.

On the other hand, this actual behavior must be consistent with the reference behavior. This in turn requires that the features of the digital road map, which are retrieved using the predefined pose, relate to the exact pose from which the observations of the scenario were procured. If, for example, the vehicle thinks it is in a different pose than it actually is due to a malfunctioning GPS module, the features of the digital road map for the incorrect pose are called up. However, a reference behavior determined on the basis of a completely different pose cannot be consistent with an actual behavior that relates to a different pose and therefore to a different traffic situation. After all, the other road user must still behave objectively in accordance with the reference behavior.

If all these conditions are met, it can be assumed with a high degree of probability that both the recording of observations and the determination of the vehicle's own pose function properly and that the digital road map also accurately depicts reality with regard to this pose. This means that many components of the overall system are checked at once with just a single test. Under normal circumstances, where the actual behavior of other road users matches the reference behavior, it can therefore be assumed that the vehicle is in the correct pose and is working with an up-to-date digital road map. This means that there is a high probability that an action planned by the vehicle using this pose and this digital road map is appropriate for the traffic situation.

However, if the actual behavior is not consistent with the reference behavior determined using the digital road map, this does not allow an unambiguous conclusion to be drawn as to the exact cause. In many cases, however, the possible contributions of the various causes can be modeled at least partially probabilistically. For example, due to the comparatively low threat of sanctions, a driver is more likely to disregard a speed limit than run a red light or even disregard the ban on turning on a highway.

However, it is first and foremost important to establish that something did not work as expected. This information may already be sufficient to take countermeasures. For example, the driver can try to independently deduce a necessary correction to the digital road map from the actual behavior of other road users;

the driver of the vehicle is requested to take back control of the vehicle in whole or in part, a driving assistance system or a system for at least partially automated driving is set to an operating mode with reduced functionality in which errors can be better intercepted, or such an automated system can be shut down completely, which may mean bringing the vehicle to a halt on a pre-planned emergency stop trajectory.

The other road user(s) and/or their actual behavior can, for example, be transferred to the reference system of the digital road map. They can then be associated in this reference system with features of the digital road map that are relevant to their reference behavior. Not all features recorded in the digital road map affect the reference behavior of every road user. For example, only vehicles that exceed a certain size or weight may be prohibited from entering a road.

In particular, for example, statements with regard to several other road users who are associated with one and the same feature of the digital road map can be combined to form a statement as to the extent to which this feature is plausible. In this way, the influence of individual other road users who deliberately do not comply with a prescribed reference behavior can be suppressed. A basic assumption for the plausibility check is that the majority of other road users will also follow a predefined reference behavior. For example, the actual behavior of many other road users with regard to the feature of the digital road map can be aggregated with a majority decision or a similar mechanism.

In a particularly advantageous embodiment, a conditional probability or chance is determined for at least one feature of the digital road map that this feature is plausible under the condition of the determined actual behavior. This allows the stochastic nature of the behavior of other road users to be mapped. A chance is the quotient of the conditional probability that the feature is plausible under the condition of the determined actual behavior and the conditional probability that the feature is not plausible under the condition of the same determined actual behavior.

In a further advantageous embodiment, the conditional probability or chance is determined under the additional assumption of an unconditional basic probability or basic chance that the feature is plausible. In this way, prior knowledge about confidence in the accuracy of the digital road map can be introduced. For example, the basic probability or basic chance can be monotonically reduced with increasing age of the digital road maps. This can take into account, for example, the experience that a certain percentage of information changes on average in the year following the publication of a typical city map.

The conditional probability or chance that the feature is plausible under the condition of the determined actual behavior of many other road users can then include, for example, a product of conditional probabilities or chances that the actual behavior of one of these other road users is plausible under the condition of the feature of the digital road map in accordance with Bayes' theorem. These probabilities or chances are comparatively transparent and therefore easy to determine.

For example, let $b_1, \ldots, b_N$ be the actual behavior of other road users 1, . . . , N and $p_G(m=1)$ the unconditional basic probability, regardless of this actual behavior, that a certain feature m of the digital road map is plausible. The conditional probability $p(m=1|b_1, \ldots, b_N)$ that the feature m is plausible with respect to the actual behavior $b_1, \ldots, b_N$ can then be written as:

$$p(m=1|b_1, \ldots, b_N) = c \cdot p_G(m=1) \cdot \prod_{i=1}^{N} p(b_i|m=1)$$

Here c is a normalization constant, and these $p(b_i|m=1)$ are the conditional probabilities that, assuming that the feature m is plausible, the behavior $b_1, \ldots, b_N$ of the other road users 1, . . . , N is plausible. The normalization constant c is the reciprocal of the unconditional probability $p(b_1, \ldots, b_N)$ that the behavior $b_1, \ldots, b_N$ of the other road users 1, . . . , N is plausible.

This normalization constant c is dropped if the conditional chance $o(m=1|b_1, \ldots, b_N)$ is determined that the feature m is plausible in view of the actual behavior $b_1, \ldots, b_N$. This chance o is given by $$o(m=1|b_1, \ldots, b_N) = \frac{p(m=1|b_1, \ldots, b_N)}{p(m=0|b_1, \ldots, b_N)},$$

i.e., by the ratio of the conditional probabilities given the actual behavior $b_1, \ldots, b_N$, that the feature m is plausible (m=1) or not plausible (m=0).

This chance is given by $$o(m=1|b_1, \ldots, b_N) = o(m=1) \cdot \prod_{i=1}^{N} \frac{p(b_i|m=1)}{p(b_i|m=0)},$$

wherein $$o(m=1) = \frac{p_G(m=1)}{p_G(m=0)}$$

is the unconditional chance that the feature m is plausible.

From this, the required conditional probability $p(m=1|b_1, \ldots, b_N)$ can then be determined as $$p(m=1|b_1, \ldots, b_N) = 1 - \frac{1}{1 + o(m=1|b_1, \ldots, b_N)}.$$

As explained above, the observations are advantageously procured using at least one sensor carried by a vehicle. The predefined pose is then determined by comparing these observations with the digital road map. The extent to which the digital road map is plausible can then be used, for example, to continuously check during the vehicle's journey whether the vehicle's actions are being planned on the basis of coherent information.

As explained above, the primary goal is to uncover inconsistencies in the first place and to react to them. However, there are various ways of at least narrowing down the cause of inconsistencies.

In an advantageous embodiment, several candidate changes to the predefined pose are determined in response to the fact that the digital road map does not correctly reproduce the actual circumstances visible from the predefined pose. Based on the pose changed according to each candidate change, the digital road map is checked again in the manner described above to determine the extent to which it correctly reproduces the actual circumstances visible on the basis of the changed pose. In response to the fact that the improvement achieved here fulfills a predefined criterion, it is established that the determination of the predefined pose from the observations procured by the sensor works incorrectly.

If, for example, a compass used by the vehicle to determine its orientation has an offset of 10 degrees from the true orientation, then

- the observations of the scenario and the actual behavior of other road users determined from them on the one hand and
- the features retrieved from the digital road map and the reference behavior of other road users determined from them on the other hand refer to traffic situations that are rotated relative to each other by precisely these 10 degrees. This can be enough to significantly worsen the match between the actual behavior and the reference behavior. If the check is now repeated for different candidate poses that are rotated by different angles relative to the original pose, the actual behavior will match the reference behavior much better for a rotation angle of 10 degrees.

In a further advantageous embodiment, several candidate changes to the digital road map are determined in response to the fact that the digital road map does not correctly reproduce the actual circumstances visible from the predefined pose. The digital road map changed in this way is checked again to see to what extent it correctly reproduces the actual circumstances visible from the predefined pose. In response to the fact that the result of this check fulfills a predefined criterion, a changed digital road map that best reproduces the actual circumstances then replaces the previous digital road map. In this way, certain errors or inaccuracies in the digital road map can be "healed" automatically.

For example, on an expressway with two lanes in each direction of travel, the expected reference behavior is that

- vehicles initially gather in the right-hand lane in the direction of travel at low to moderate capacity and the left-hand lane is only used for overtaking, while
- both lanes are equally filled with vehicles when the road is congested.

If the automated check described above initially only shows that the actual behavior of other road users does not match this reference behavior, without any indication of the specific cause, a candidate change to the digital road map may be that a lane is closed. This is one of the most common last-minute changes, for example due to a newly installed roadworks site. If the automated check is now repeated with the modified digital road map and the actual behavior now matches the reference behavior, the cause of the original discrepancy is clarified. This knowledge can, for example, be fed back to the manufacturer of the digital road map so that they can update the road map for all users in a timely manner.

As explained above, the main purpose of the automated check of the digital road map is to continuously monitor whether the overall system of digital road map, vehicle pose determination and vehicle environment detection is still functioning properly. Therefore, in response to the fact that the digital road map correctly reproduces the actual circumstances visible from the predefined pose, the digital road map is advantageously used for the behavior planning of an at least partially automated driving vehicle and/or a driving assistance system in a vehicle. The vehicle is then controlled on the basis of this behavior planning.

The method can in particular be computer-implemented completely or partially. The disclosure therefore also relates to a computer program with machine-readable instructions which, when executed on one or more computers, cause the computer(s) to perform the described method. In this sense, control devices for vehicles and embedded systems for technical devices that are likewise capable of executing machine-readable instructions are also to be regarded as computers.

Likewise, the disclosure also relates to a machine-readable data storage medium and/or to a download product with the computer program. A download product is a digital product that can be transmitted via a data network, i.e., can be downloaded by a user of the data network, and can, for example, be offered for immediate download in an online shop.

Furthermore, a computer can be equipped with the computer program, with the machine-readable data storage medium, or with the download product.

Further measures improving the disclosure are described in greater detail hereinafter, together with the description of the preferred exemplary embodiments of the disclosure, with reference to the drawings.

DETAILED DESCRIPTION

Figure 1:
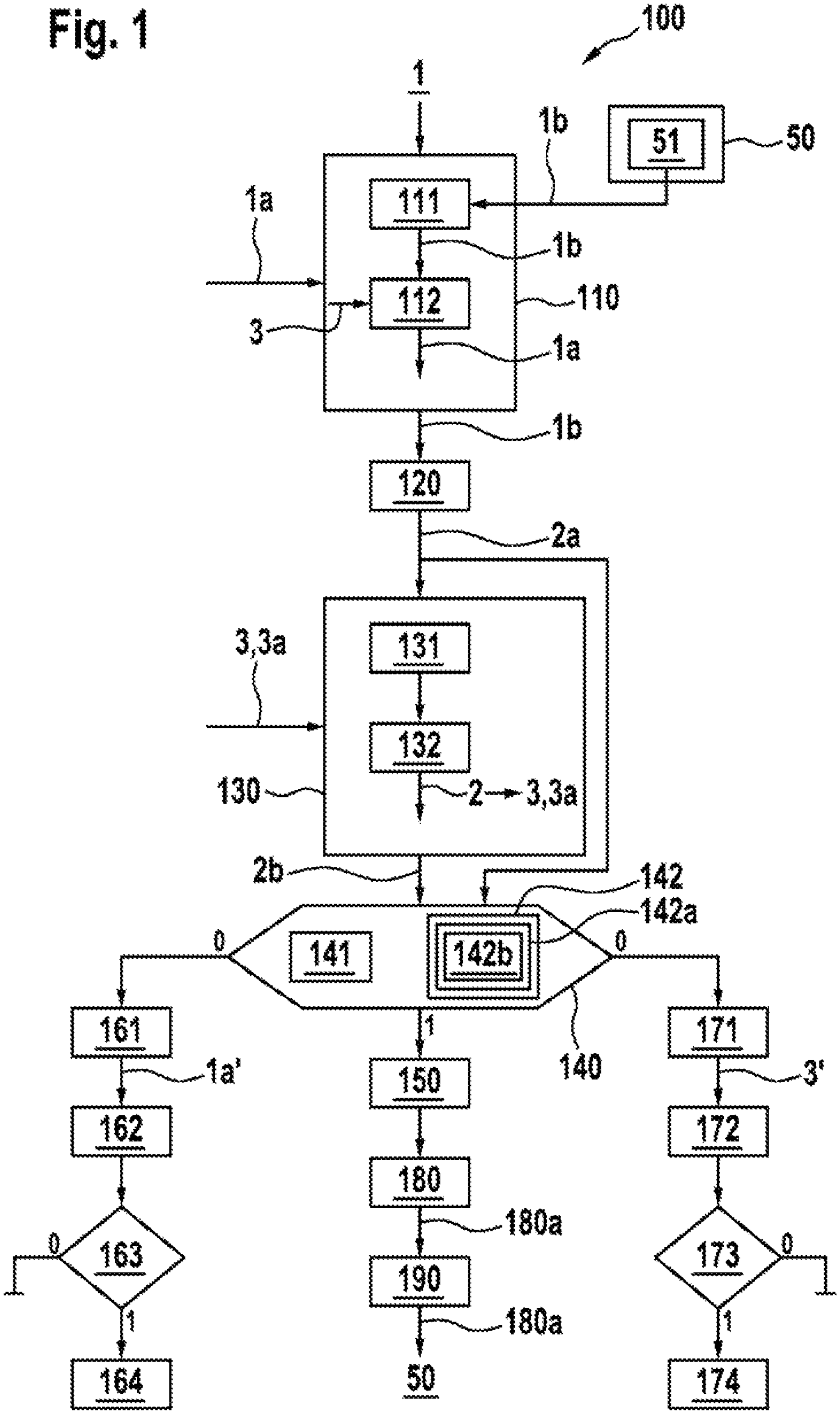
FIG. 1 Exemplary embodiment of the method 100 for checking the plausibility of a digital road map.

FIG. 1 is a schematic flowchart of an exemplary embodiment of the method 100 for checking whether a digital road map 3 correctly reproduces the actual circumstances visible from at least one predefined pose 1*a*.

In step 110, observations 1*b* of a scenario 1 are procured from the at least one pose 1*a*.

According to block 111, the observations 1*b* may be procured with at least one sensor 51 carried by a vehicle 50. According to block 112, the predefined pose 1*a* can then be determined on the basis of a comparison of these observations 1*b* with the digital road map 3.

In step 120, the actual behavior 2*a* of one or more other road users 2 is determined from the observations 1*b*.

In step 130, a reference behavior 2*b* of the other road user(s) 2 is determined on the basis of one or more features 3*a* of the digital road map 3.

For this purpose, according to block 131, the other road user(s) 2 and/or their actual behavior 2*a* can be transferred to the reference system of the digital road map 3. According to block 132, the other road user(s) 2 in this reference system can then be associated with features 3*a* of the digital road map 3 that are relevant for their reference behavior 2*b*.

Step 140 checks whether the actual behavior 2*a* is consistent with the reference behavior 2*b*.

According to block 141, statements with regard to several other road users 2 that are associated with one and the same feature 3*a* of the digital road map 3 can be combined to form a statement as to the extent to which this feature 3*a* is plausible.

According to block 142, a conditional probability or chance can be determined for at least one feature 3*a* of the digital road map 3 that this feature 3*a* is plausible under the condition of the determined actual behavior 2*a*.

In accordance with block 142*a*, the conditional probability or chance can be determined with the additional assumption of an unconditional basic probability or basic chance that feature 3*a* is plausible. According to block 142*b*, this basic probability or basic chance can be monotonically reduced with increasing age of the digital road map 3.

If the actual behavior 2*a* is consistent with the reference behavior 2*b* (truth value 1 at step 140), it is established in step 150 that the digital road map 3 correctly reproduces the actual circumstances visible from the predefined pose 1*a*, at least with regard to the features 3*a* from which the reference behavior 2*b* was determined.

In this case, in step 180, the digital road map 3 may be used for behavior planning 180*a* of an at least partially automated driving vehicle 50, and/or a driving assistance system in a vehicle 50. The vehicle can then be controlled in step 190 on the basis of this behavior planning 180*a*.

However, if the actual behavior 2*a* is not consistent with the reference behavior 2*b* (truth value 0 at step 140), several candidate changes 1*a*' of the predefined pose 1*a* can be determined in step 161. In step 162, the digital road map 3 can then be checked again for each candidate change 1*a*' to determine the extent to which it correctly reproduces the actual circumstances visible on the basis of the changed pose 1*a*.

In step 163, it can be checked whether an improvement is achieved compared to the original pose 1*a*, which fulfills a predefined criterion. If this is the case (truth value 1), it can be established in step 164 that the determination of the predefined pose 1*a* from the observations procured by the sensor 51 is operating incorrectly.

Alternatively, or in combination, a plurality of candidate changes 3' to the digital road map 3 may be determined in step 171. The digital road map 3 changed in this way can be checked again in step 172 to determine the extent to which it correctly reproduces the actual circumstances visible from the predefined pose 1*a*.

In step 173, it can be checked whether the result of this new check fulfills a predefined criterion, i.e., in particular whether it represents an improvement over the check of the original digital road map 3. If this is the case, a changed digital road map 3 that best reproduces the actual circumstances may be substituted for the previous digital road map 3 in step 174.

Figure 2:
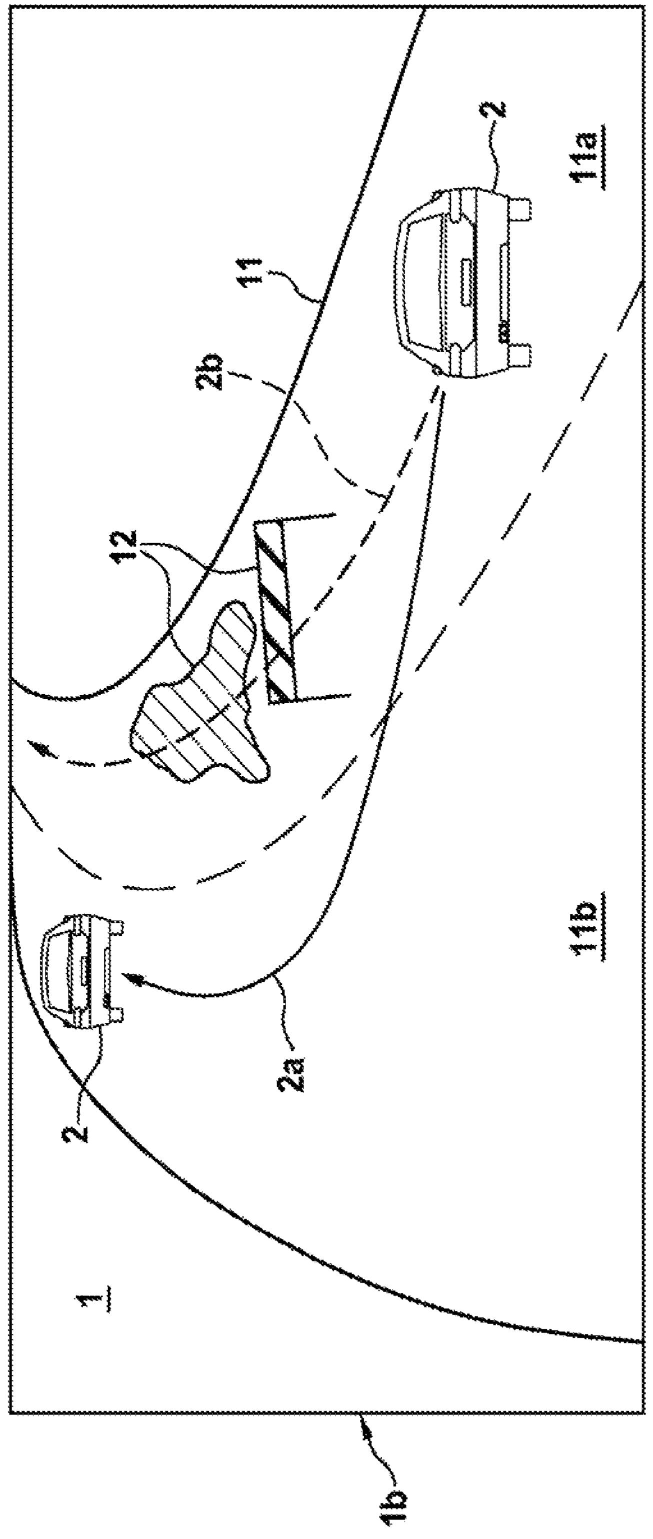
FIG. 2 Example traffic situation in which there is a discrepancy between the reference behavior 2*b* and the actual behavior 2*a* of another road user 2.

FIG. 2 shows an example of a scenario 1 in which there is a discrepancy between the reference behavior 2*b* and the actual behavior 2*a* of another road user 2. An expressway 11 has a right-hand lane 11*a* and a left-hand lane 11*b*. According to observation 1*b* of scenario 1, a vehicle 2 initially drives in the right-hand lane 11*a*. Based on the digital map 3, which contains the expressway 11, it is therefore expected that vehicle 2 will initially continue to drive there as reference behavior 2*b*. However, due to a short-term roadworks site 12, which is not shown in the digital road map 3, the vehicle 2 must show the actual behavior 2*a* of changing to the left-hand lane 11*b*. In particular, if this is the case for more vehicles 2, it can be deduced from this discrepancy according to the method 100 described above that the right-hand lane 11*a* is currently not usable.

The invention claimed is:

1. A method for checking whether a digital road map correctly reproduces actual circumstances visible from at least one predefined pose, comprising:

procuring observations of a scenario from the at least one predefined pose;

determining an actual behavior of one or more other road users from the procured observations;

determining a reference behavior of the one or more other road users based on one or more features of the digital road map;

in response to the determined actual behavior being consistent with the determined reference behavior, establishing that the digital road map correctly reproduces the actual circumstances visible from the at least one predefined pose at least with regard to the one or more features from which the reference behavior was determined; and controlling a vehicle using the digital road map in response to the digital road map correctly reproducing the actual circumstances visible from the predefined pose.

2. The method according to claim 1, wherein:

data based on the one or more other road users, and/or the determined actual behavior, are transferred into a reference system of the digital road map; and the one or more other road users in the reference system are associated with the one or more features of the digital road map that are relevant for the determined reference behavior.

3. The method according to claim 2, wherein statements with regard to a plurality of other road users associated with the one or more features of the digital road map are combined to form a statement as to an extent to which the one or more features are plausible.

4. The method according to claim 1, wherein for at least one feature of the one or more features of the digital road map a conditional probability or chance is determined that, under a condition of the determined actual behavior, the at least one feature is plausible.

5. The method according to claim 4, wherein the conditional probability or chance is determined under an additional assumption of an unconditional basic probability or basic chance that the at least one feature is plausible.

6. The method according to claim 5, wherein the basic probability or basic chance is monotonically reduced with increasing age of the digital road map.

7. The method according to claim 5, wherein the conditional probability or chance comprises a product of conditional probabilities or chances, respectively, that the determined actual behavior of one of a plurality of other road users is plausible under the condition of the at least one feature of the digital road map.

8. The method according to claim 1, wherein:

the observations are procured with at least one sensor carried by a vehicle, and the at least one predefined pose is determined based on a comparison of the procured observations with the digital road map.

9. The method according to claim 8, wherein in response to the digital road map not correctly reproducing the actual circumstances visible from the at least one predefined pose, the method further comprises:

determining several candidate changes of the at least one predefined pose;

checking the digital road map again for each of the several candidate changes to determine an extent to which the digital road map correctly reproduces the actual circumstances visible based on a changed pose; and in response to an improvement obtained thereby satisfying a predefined criterion, establishing that the determination of the at least one predefined pose from the observations procured by the sensor is operating incorrectly.

10. The method according to claim 1, wherein in response to the digital road map not correctly reproducing the actual circumstances visible from the at least one predefined pose, the method further comprises:

determining several candidate changes of the digital road map;

checking the digital road map changed in this way again in each case to determine an extent to which the digital road map correctly reproduces the actual circumstances visible from the predefined pose; and in response to a result of the check of the digital road map meeting a predefined criterion, replacing the digital road map with a changed digital road map that best reproduces the actual circumstances.

11. The method according to claim 1, the controlling the vehicle further comprising:

using the digital road map for behavior planning of the vehicle , and controlling the vehicle in an at least partially automated manner based on the behavior planning.

12. The method according to claim 1, wherein a computer program contains machine-readable instructions which, when executed on one or more computers, cause the one or more computers to perform the method.

13. A non-transitory machine-readable data storage medium including the computer program according to claim 12.

14. One or more computers having the computer program according to claim 12.

* * * * *